(12) United States Patent
Millington

(10) Patent No.: US 8,086,752 B2
(45) Date of Patent: Dec. 27, 2011

(54) SYSTEMS AND METHODS FOR SYNCHRONIZING OPERATIONS AMONG A PLURALITY OF INDEPENDENTLY CLOCKED DIGITAL DATA PROCESSING DEVICES THAT INDEPENDENTLY SOURCE DIGITAL DATA

(75) Inventor: Nicholas A. J. Millington, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 708 days.

(21) Appl. No.: 11/906,702

(22) Filed: Oct. 2, 2007

(65) Prior Publication Data

US 2008/0120429 A1 May 22, 2008

Related U.S. Application Data

(60) Provisional application No. 60/860,964, filed on Nov. 22, 2006, provisional application No. 60/876,455, filed on Dec. 20, 2006.

(51) Int. Cl.
*G06F 15/16* (2006.01)

(52) U.S. Cl. .......................... 709/231; 709/248; 370/503

(58) Field of Classification Search .................. 709/231, 709/248; 370/503
See application file for complete search history.

(56) References Cited

U.S. PATENT DOCUMENTS

| | | | |
|---|---|---|---|
| 5,467,342 A * | 11/1995 | Logston et al. | ............... 370/253 |
| 6,009,457 A | 12/1999 | Moller | |
| 6,128,318 A | 10/2000 | Sato | |
| 6,199,169 B1 | 3/2001 | Voth | |
| 6,308,207 B1 * | 10/2001 | Tseng et al. | .................. 709/224 |
| 6,324,586 B1 | 11/2001 | Johnson | |
| 6,351,821 B1 | 2/2002 | Voth | |
| 6,836,788 B2 | 12/2004 | Kim et al. | |
| 6,934,766 B1 | 8/2005 | Russell | |
| 7,312,785 B2 | 12/2007 | Tsuk | |
| 7,372,846 B2 | 5/2008 | Zwack | |
| 2001/0022823 A1 * | 9/2001 | Renaud | .......................... 375/359 |
| 2001/0032188 A1 | 10/2001 | Miyabe | |
| 2002/0042844 A1 * | 4/2002 | Chiazzese | ..................... 709/248 |
| 2002/0090914 A1 | 7/2002 | Kang et al. | |
| 2002/0093478 A1 * | 7/2002 | Yeh | ................................ 345/98 |
| 2002/0112244 A1 | 8/2002 | Liou et al. | |
| 2003/0099212 A1 | 5/2003 | Anjum | |
| 2003/0126211 A1 | 7/2003 | Anttila et al. | |
| 2004/0001484 A1 * | 1/2004 | Ozguner | ....................... 370/389 |

(Continued)

OTHER PUBLICATIONS

Benslimane, Abderrahim, "A Multimedia Synchronization Protocol for Multicast Groups," 2000, IEEE, Proceedings of the 26th Euromicro Conference, 2000, vol. 1, pp. 456-463.

(Continued)

*Primary Examiner* — Wing Chan
*Assistant Examiner* — Kostas Katsikis
(74) *Attorney, Agent, or Firm* — Hanley, Flight & Zimmerman, LLC; Mark W. Triplett

(57) ABSTRACT

In a system for distributing data, distribution device is configured to distribute timestamp, offset and source location information for a digital data stream to an execution device, and the execution device is configured to seek digital data corresponding to the received information. The execution device is further configured to execute the digital data relative to a clock rate maintained by the distribution device. Related methods include receiving timestamp, offset and source location information for the digital data stream and seeking digital data corresponding to the received offset and source location information.

29 Claims, 2 Drawing Sheets

U.S. PATENT DOCUMENTS

| | | | |
|---|---|---|---|
| 2004/0170383 A1* | 9/2004 | Mazur | 386/68 |
| 2004/0203378 A1 | 10/2004 | Powers | |
| 2004/0249965 A1* | 12/2004 | Huggins et al. | 709/231 |
| 2005/0114538 A1* | 5/2005 | Rose | 709/231 |
| 2005/0281255 A1* | 12/2005 | Davies et al. | 370/389 |
| 2005/0283820 A1* | 12/2005 | Richards et al. | 725/146 |
| 2005/0288805 A1* | 12/2005 | Moore et al. | 700/94 |
| 2007/0054680 A1* | 3/2007 | Mo et al. | 455/502 |
| 2007/0271388 A1* | 11/2007 | Bowra et al. | 709/231 |

OTHER PUBLICATIONS

Mills, David, "Precision Synchronization of Computer Networks Clocks," 1994, ACM Computer Communications Review, vol. 24, pp. 28-43.

Bretl et al, "MPEG2 Tutorial," 2000, www.bretl.com, retrieved http://www.bretl.com/mpeghtml/MPEGindex.htm on Jan. 2009, pp. 1-23.

Huang et al. A Synchronization Infrastructure for Multicast Multimedia at the Presentation Layer. IEEE Transactions on Consumer Electronics, vol. 43, No. 3, Aug. 1997.

Ishibashi et al. A Group Synchronization Mechanism for Stored Media in Multicast Communications. IEEE, 1997.

Ishibashi et al. A Group Synchronization Mechanism for Live Media in Multicast Communications. IEEE, 1997.

International Search Report for Patent Cooperation Treaty application No. PCT/US04/23102 dated Aug. 1, 2008.

Jo et al., "Synchronized One-to-Many Media Streaming with Adaptive Playout Control," In: Proceedings of SPIE, vol. 4861, Edited by Tescher et al., Dec. 2002, pp. 71-82.

Mills, David L., "Network Time Protocol Specification, Implementation and Analysis," Request for Comments: 1305, Network Working Group, Mar. 1992.

* cited by examiner

SYSTEMS AND METHODS FOR SYNCHRONIZING OPERATIONS AMONG A PLURALITY OF INDEPENDENTLY CLOCKED DIGITAL DATA PROCESSING DEVICES THAT INDEPENDENTLY SOURCE DIGITAL DATA

CROSS-REFERENCE TO RELATED APPLICATIONS

The present application claims the benefit and priority of U.S. Provisional Patent Application Ser. No. 60/860,964 filed on Nov. 22, 2006 for "Systems and Methods for Synchronizing Operations Among a Plurality of Independently Clocked Digital Data Processing Devices that Independently Source Digital Data," which is incorporated herein by reference and U.S. Provisional Patent Application Ser. No. 60/876,455 filed on Dec. 20, 2006 for "Systems and Methods for Synchronizing Operations Among a Plurality of Independently Clocked Digital Data Processing Devices that Independently Source Digital Data," which is incorporated herein by reference. The present application incorporates by reference U.S. patent application Ser. No. 11/801,468 filed on May 9, 2007 for "Systems and Methods for Synchronizing Operations Among a Plurality of Independently Clocked Digital Data Processing Devices Without a Voltage Controlled Crystal Oscillator," which is a continuation-in-part claiming the benefit and priority of U.S. patent application Ser. No. 10/816,217 filed on Apr. 1, 2004 for "System and Method For Synchronizing Operations Among a Plurality of Independently Clocked Digital Data Processing Devices," which claims the benefit and priority of U.S. Provisional Patent Application Ser. No. 60/490,768 filed on Jul. 28, 2003 for "Method For Synchronizing Audio Playback Between Multiple Networked Devices," both of which are also incorporated herein by reference and U.S. patent application Ser. No. 11/113,363 filed on Apr. 23, 2005 for "System and Method for Synchronizing Channel Handoff As Among a Plurality of Devices."

FIELD OF THE INVENTION

The present invention relates generally to digital content, and more particularly to systems and methods for synchronizing operations among a plurality of independently clocked digital data processing devices that independently source digital data.

DESCRIPTION OF RELATED ART

Synchronization of digital data among a plurality of independently clocked digital data processing devices (i.e. at least one distribution device and at least one execution device) in a synchrony group may be performed when a single distribution device provides the same digital data and timing information to some or all of the execution devices in the synchrony group. In certain situations, however, a single distribution device may only send the same timing information without the corresponding digital data to some or all of the execution devices in the synchrony group. Accordingly, each execution device is posed with the problem of needing to source the digital data from an alternative source and needing to execute the digital data at or near the same time as other execution devices in the group are executing the same digital data (i.e., in synchrony). There is therefore a need for systems and methods for synchronizing operations among a plurality of independently clocked digital data processing devices that independently source digital data.

SUMMARY OF THE INVENTION

Exemplary systems according to the present invention include a distribution device configured to distribute timestamp, offset and source location information for a digital data stream to an execution device. The execution device is configured to seek digital data corresponding to the received information, and to retrieve and execute the digital data relative to a clock rate maintained by the distribution device, as facilitated by the timestamp information. Exemplary methods include receiving timestamp, offset and source location information for the digital data stream in an execution device and seeking digital data corresponding to the received offset and source location information.

DETAILED DESCRIPTION

Exemplary systems and methods provide synchronization of digital data among a plurality of independently clocked digital data processing devices. In general, independently clocked digital data processing devices may include a distribution device and one or more execution devices. In some situations, the distribution device may distribute the same timing information and digital data to one or more execution devices (or the distribution device may distribute copies of the same timing information and digital data). The execution devices each execute the digital data per the timing information, resulting in each execution device playing the same digital data at or near the same time (i.e., in synchrony as a synchrony group). In other situations, the distribution device may distribute the same timing information to one or more execution devices without the corresponding digital data. Such situations may arise in the case of systems operating with Windows Media Digital Rights Management™ ("WM DRM") software or similar systems with forwarding restrictions that limit or prevent a distribution device from copying and/or distributing digital data to execution devices. The exemplary systems and methods provided herein allow each execution device to independently source or seek digital data corresponding to timestamp, offset, and source location information provided by the distribution device to result in each execution device executing the same or nearly the same digital data at or near the same time in a synchrony.

Figure 1:
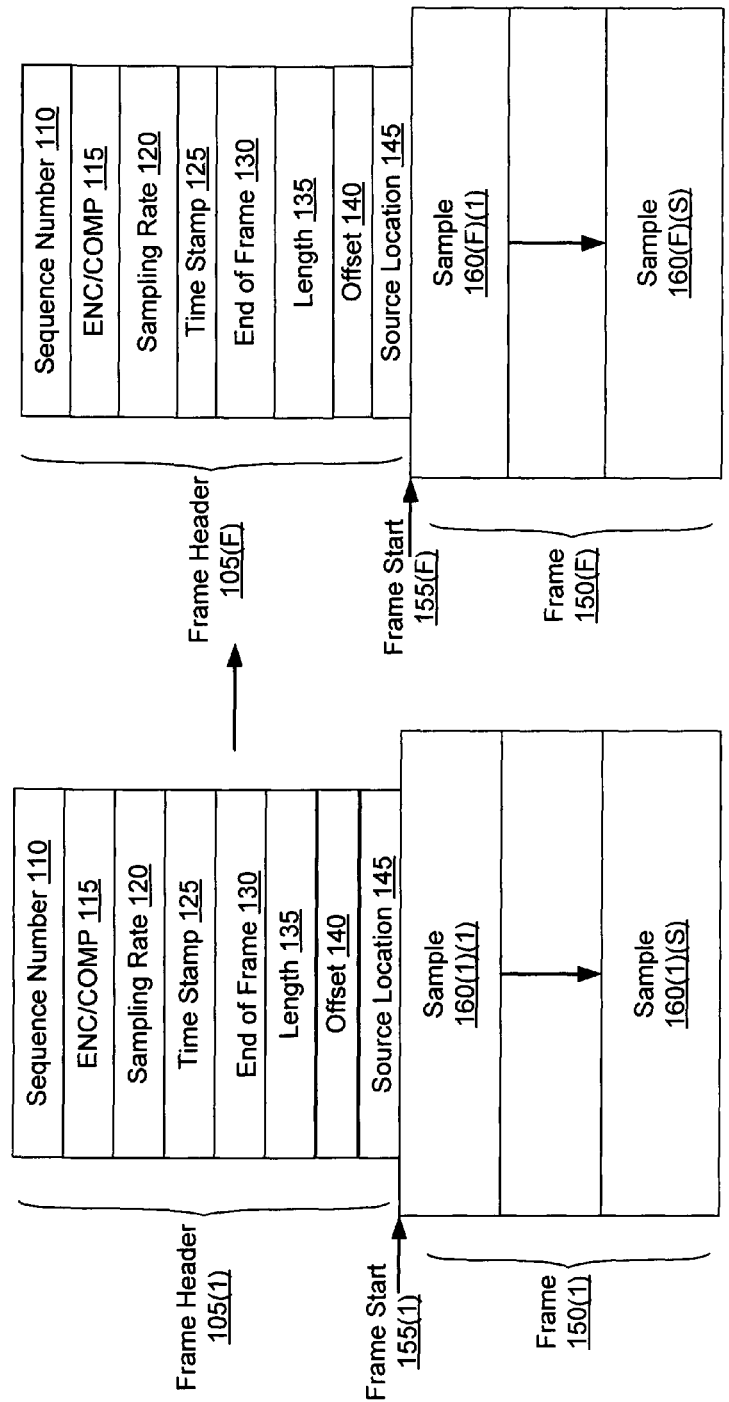
FIG. 1 schematically depicts an illustrative framing that may be added to digital data according to one exemplary system and method for synchronization of digital data among a plurality of independently clocked digital data processing devices.

FIG. 1 depicts illustrative framing data according to one exemplary system and method for synchronization of a digital data stream among a plurality of independently clocked digital data processing devices. Depicted in FIG. 1 is a digital data stream 100, which includes a sequence of frames 150(1) through 150(F) (generally identified by reference numeral **150(*f*)). Each frame 150(*f*) has a frame start 155(*f*), as shown by frame start 155(1) with respect to exemplary frame 150(1). Each frame 150(*f*) includes a series of audio, visual, audiovisual and/or other digital samples as illustrated by the series of samples 160(1)(1) through 160(1)(S) (generally identified by reference numeral 160(f)(s)) with respect to frame 150(1). The number of samples 160(f)(s) may differ in each frame 150(f), or the number of samples may be the same for some or all of the frames in digital data stream 100**. According to some embodiments, the frames and corresponding samples ("digital data") may be received by a distribution device from a source of digital data, such as the Internet.

The illustrative framing strategy shown in FIG. 1 includes a frame header 105(f) associated with each frame 150(f), as exemplified by frame header 105(1) with respect to frame 150(1). According to various embodiments, the distribution device may add the frame header 105(f) to the received digital data and copy and/or distribute some or all of the information in the frame header, without the corresponding digital data. According to further embodiments, the distribution device may also copy and/or distribute an empty or unusable file that previously contained the digital data. Each frame header 105 (f) has a number of fields for storing various types of information. For example, the header 105(1) associated with frame 150(1) includes a sequence number field 110, an encoding type field 115, a sampling rate field 120, a time stamp field 125, an end of frame field 130, a length field 135, an offset field 140, and a source location field 145. Further, each frame header may include a packet ID number, and a small 4 bit number called an encryption parameter, set ID, or a similar term. The information in the various fields within the frame header may be copied and/or distributed by the distribution device at the same time or at different times. For example, the information in the source location field 145 may be copied and distributed by the distribution device before the distribution device copies and distributes the corresponding information in the offset field 140. Other variations of the order of distributing data may be employed and remain within the scope of the exemplary systems and methods contemplated herein.

Generally, the sequence number field 110 receives a sequence number "f" that identifies the relative position of the frame 150(f) in the sequence of frames comprising the digital data stream 100. For example, with respect to sequence number field 110 as shown in the exemplary frame header 105(1), the received sequence number is "1." The encoding type field 115 receives a value that identifies the type of encoding and/or compression that has been used in generating the digital data stream. Conventional encoding or compression schemes include, for example, MP3 and WAV encoding and/or other compression schemes, although it will be appreciated that other schemes may be provided for as well. The sampling rate field 120 receives sampling rate information that may indicate the sampling rate relative to an independently clocked distribution device and/or relative to an independently clocked execution device.

The time stamp field 125, according to some embodiments, stores a time stamp identifying a time at which an independently clocked execution device may execute a particular frame (or execute an independently sourced copy of a particular frame) and store it as the time stamp in time stamp field 125. A time stamp may be generated for each frame 150(f) of a particular digital data stream, a time stamp may be generated for only a first frame 150(1) of a particular digital data stream, or a time stamp may be generated for some other variation of frames associated with a digital data stream. In further systems and methods, the time stamp may be generated for each frame 150(f) of a particular digital data stream, however, only various selected time stamps may be copied and/or distributed by the distribution device to the execution devices in the synchrony group.

According to one embodiment, a time stamp is generated, copied and distributed for each frame 150(f) of a digital data stream 100 in order to allow multiple execution devices to execute a sequence of frames in synchrony, even when one of the execution devices fails to seek and/or retrieve one or more frames due to a power loss or other interruption. In other words, because a time stamp is associated with each frame, an execution device may be able to determine which frame to execute at a particular time in the event of an interruption, rather than just resuming by executing each subsequent frame in sequence without respect to a common time element. In an alternative embodiment, the execution device may execute one or more frames per a time stamp and execute each subsequent frame in a sequence without respect to a time stamp.

In one embodiment, the condition of the end of frame field 130 indicates whether a particular frame 150(f) contains the last samples for the digital data stream 100. If the frame 150(f) does not contain the samples associated with the end of the digital data stream 100, the end of frame field 130 may be clear. On the other hand, if the frame 150(f) such as exemplary frame 150(F) contains the samples associated with the end of the digital data stream 100, the end of frame field 130 may be set. Additionally, the length field 135 may contain a value that identifies the number of samples in the last frame 150(F) of the digital data stream 100.

According to one embodiment, offset information stored in the offset field 140 may specify a random-access offset corresponding to a particular frame start 155(f). A second frame 150(2) may follow the exemplary first frame 150(1) in the progression or sequence of frames ending with frame 150(F). The information in the offset field 140 that is associated with the second frame 150(2) may be copied and distributed by a distribution device to an execution device. The execution device receiving the information in the offset field 140 associated with the second frame 150(2) may use the offset information to seek frame start 155(2) on frame 150(2) on a copy of the digital data that is independently sourced by the execution device from a second digital data source. These offsets may be of any desired length, such as byte offsets, sample offsets, etc. Alternatively, a system may use a presentation time, i.e., a unit of time in well-defined intervals (e.g., 100 nanosecond intervals). Elements such as byte offsets, sample offsets, presentation times, and/or other similar elements may allow each independently clocked execution device in a synchrony group to seek a particular frame start 155(f) for each frame 150(f) on a copy of the digital data that is independently sourced for retrieval and execution by each respective independently clocked execution device.

In one embodiment, source location information is stored in the source location field 145. The source location information specifies a location for a source of a frame 150(f) having samples 160(f)(s). For example, the source location information stored in source location field 145 may direct an execution device to seek digital data from a particular Internet domain address. The distribution device may copy and/or distribute data from a source location prior to sending out any offset information in order to allow the receiving execution device to connect to the source before seeking a particular offset from the source. Alternatively, the distribution device may distribute a source location at the same time or after copying and/or distributing offset information. Once an execution device receives the offset and source location information, it may seek and retrieve digital data for execution at a time indicated by the time stamp information in field 125. According to one embodiment, the source location field 145 may reflect a Universal Resource Indicator ("URI") such as a network address (e.g., IP address) as the location of a digital data source. According to another method, the source location field 145 may reflect a Universal Unique Identifier ("UUID") such as a media server as the location of digital data source. Additionally, the location of a digital data source as reflected in the source location field 145 may be distributed by a distribution device to an execution device using standard communication protocols, such as multicast streaming protocol.

In one exemplary method, a distribution device may receive a plurality of frames of digital data in WM DRM format from a digital data source. Collectively, all of these frames form a digital data payload, and may be contained within a single unit of measure called a "packet," such as an Advanced Systems Format ("ASF") packet. A typical ASF packet may comprise 5-6 kilobytes of digital data, which may represent a few hundred milliseconds of audio. In one exemplary embodiment, a distribution device may blank out the ASF packet of digital data in WM DRM format with 0x00 bytes. In an alternative embodiment, a distribution device may truncate the ASF packet in the sense that some or all of its trailing 0x00 bytes are removed. The distribution device may blank out and/or truncate a packet before or after it adds a frame header to a packet. In either case, the distribution device may blank out or truncate a packet before copying and/or distributing a corresponding frame header to an execution device. Once the frame header is received by the execution device, it may add or restore some or all of the 0x00 padding that was present on the packet before it was blanked out and/or truncated by the distribution device. The execution device may then reference a timestamp, a source location, and a digital data descriptor in the frame header. The digital data descriptor represents a file location, and within the file offset information may be found.

According to a further exemplary method, a distribution device may distribute some or all of the information in the frame header to two or more execution devices using a multicast protocol. The receiving execution devices may then:

a) insert the timestamp, source location and offset information into their respective caches;

b) look up the IP address of the digital data source by mapping the UUID to an IP address; and c) authorize themselves with the digital data source or authentication server if necessary (e.g., acquire a license), and seek and retrieve the digital data as specified by the frame header and buffer a portion of the digital data inside a socket buffer.

At the time the digital data is to be executed by the execution devices, each respective execution device may execute the buffered portion of the digital data from cache memory. In the event a new execution device subsequently joins the existing execution devices, a cache miss may occur. This may happen if the new device has not yet received the digital data. In this case, the new execution device may obtain the necessary information from the distribution device using an out-of-band HTTP transmission and then join the existing execution devices.

According to an even further exemplary method, each respective execution device may notify the distribution device via an out-of-band HTTP transaction that the respective execution device is prepared to initiate execution, in the event the distribution device can not determine how long it might take each execution device to acquire a license and buffer an adequate amount of digital data in cache memory. For the first in a series of tracks to be executed consecutively without delay, the distribution device may wait a certain bounded period of time until all execution devices have reported the completion of buffering. For the subsequent tracks, this waiting is not performed, since the track-to-track overlap is deemed a sufficient period of time.

Figure 2:
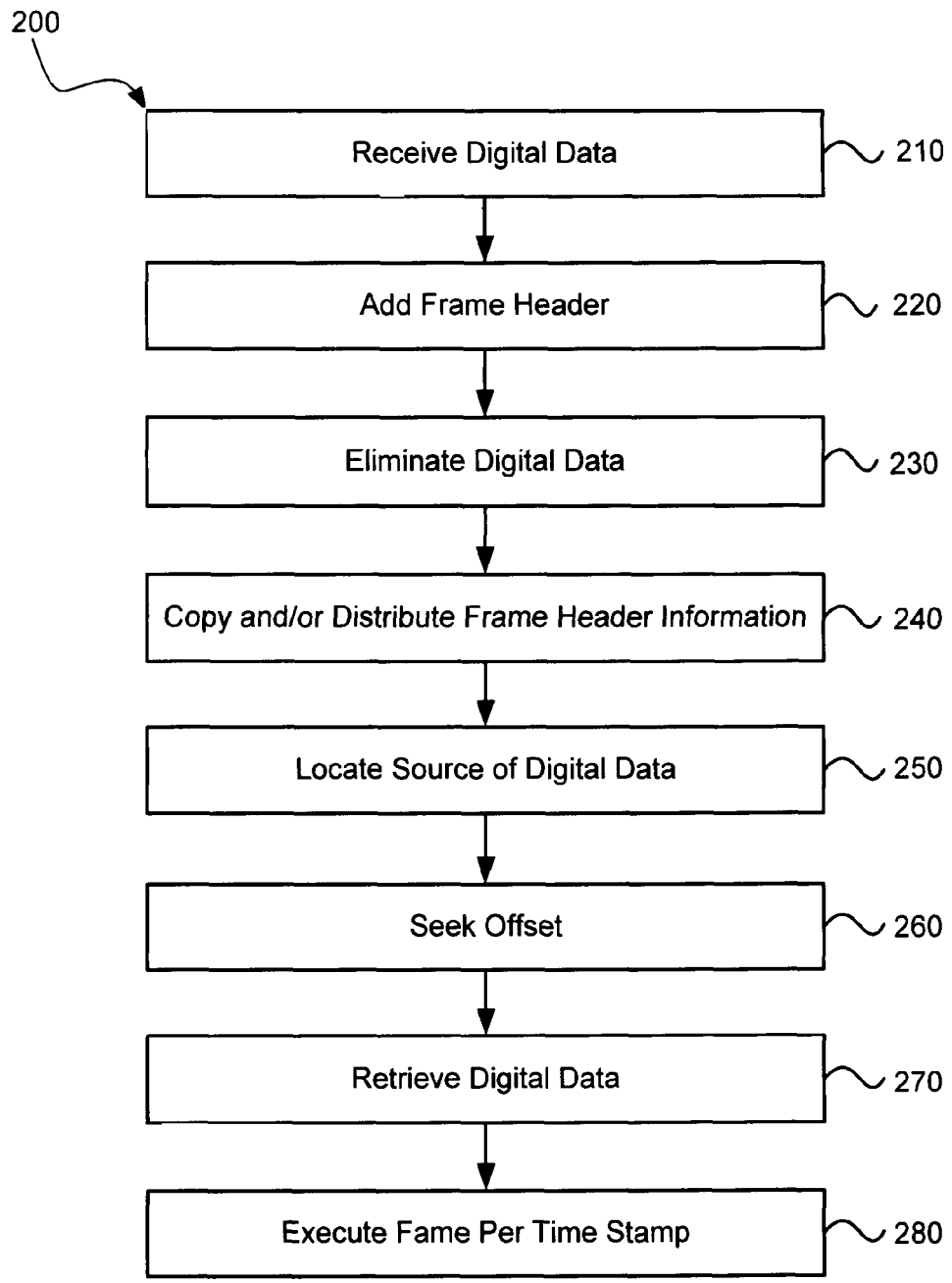
FIG. 2 is a flow chart of an exemplary process for synchronizing operations among a plurality of independently clocked digital data processing devices that independently source digital data.

FIG. 2 is a flow chart of an exemplary process 200 for synchronizing operations among a plurality of independently clocked digital data processing devices that independently source digital data.

At step 210, digital data is received by a distribution device. As described herein, digital data includes the frames 150(*f*) (FIG. 1) and corresponding samples 160(*f*)(*s*) (FIG. 1) received from a source of digital data, such as the Internet. In the case of systems operating with WM DRM or similar systems with forwarding restrictions, it may not be desirable or possible for a distribution device to copy and/or distribute received digital data. Accordingly, each execution device in a synchrony group may independently seek, retrieve and execute digital data based upon time stamp, offset and source location information provide by the distribution device.

At step 220, a frame header 105(*f*) (FIG. 1) is added to the received digital data. As discussed above and shown in FIG. 1, each frame header 105(*f*) may have a number of fields for storing various types of information, including a sequence number field 110, an encoding type field 115, a sampling rate field 120, a time stamp field 125, an end of frame field 130, a length field 135, an offset field 140, and a source location field 145.

At step 230, the received digital data is eliminated and/or rendered useless by the distribution device before the frame header 105(*f*) is copied and/or distributed to an execution device. According to some embodiments, a distribution device may blank out with 0x00 bytes an ASF data payload of exemplary frames originally encrypted with WM DRM.

At step 240, some or all of the information in the frame header 105(*f*) is copied and/or distributed by the distribution device. According to some embodiments, timestamp, offset and source location information is copied and/or distributed by the distribution device. The information in the various fields within the frame header may be copied and/or distributed at the same time or at different times. For example, the information in the source location field 145 may be copied and distributed by the distribution device before the distribution device copies and distributes the corresponding information in the offset field 140 and/or the timestamp field 125.

At step 250, an execution device receiving the distributed frame header information uses the information in the source location field 145 to locate a source of digital data. The source location information in the source location field 145 specifies a location for a source of frames 150(*f*) having samples 160 (*f*)(*s*).

At step 260, after locating the source of digital data, the execution device may seek an offset specified in the offset field 140. For example, an execution device may use the information in the offset field 140 to seek a frame start 155(*f*) for a particular frame 150(*f*) as embodied on a copy of the digital data that is independently sourced from the digital data source identified during step 250.

At step 270, the execution device retrieves the digital data corresponding to a particular offset provided by the distribution device.

At step 280, the execution device executes the retrieved digital data, and each execution device uses the information stored in the time stamp field 125 to execute the retrieved digital data at the same time or nearly at the same time as other execution devices in the synchrony group are executing the same digital data.

These techniques may allow for the accommodating of requirements associated with various digital data forms and formats such as WM DRM, which prohibits a single distribution device from providing the same digital data to some or all of the execution devices forming a synchrony group. Such techniques may also support execution devices that retrieve digital data for synchronous execution, by allowing some or all of the independently clocked execution devices to obtain a source location of digital data. Finally, multi-zone execution systems may be able to start execution simultaneously (with high probability), even in congested networks or in the event that a digital data source introduces variable delay in streaming the data. This avoids having devices start at various times, before they are synchronized.

While various embodiments have been described above, it should be understood that they have been presented by way of example only, and not limitation. Thus, the breadth and scope of a preferred embodiment should not be limited by any of the above-described exemplary embodiments.

The invention claimed is:

1. A system for distributing digital data, the system comprising:
  a digital data processing device configured to add header information to a stream that includes digital data, process the stream to render the digital data unusable by an execution device, wherein rendering the digital data unusable by an execution device comprises at least one of blanking out and truncating the digital data, and distribute the stream, wherein the header information includes timestamp information, offset information, and source location information for the stream; and
  an execution device configured to receive the processed stream from the digital data processing device, wherein the processed stream includes the digital data rendered unusable by the digital data processing device, locate a source of the digital data other than the digital data processing device based on the source location information, seek an offset in the digital data based on the offset information, and retrieve the digital data at the offset from the source other than the digital data processing device.

2. The system of claim 1, wherein the execution device is further configured to execute the digital data relative to a clock rate maintained by the digital data processing device.

3. The system of claim 2, wherein the execution device is further configured to adjust a number of samples per frame of the digital data in relation to the clock rate maintained by the digital data processing device.

4. The system of claim 2, wherein the execution device is further configured to adjust a clock rate of the execution device in relation to the clock rate maintained by the digital data processing device.

5. The system of claim 1, wherein the digital data processing device is further configured to adjust the timestamp information relative to a clock rate maintained by the execution device.

6. The system of claim 5, wherein the execution device is further configured to execute the digital data relative to a clock rate maintained by the execution device.

7. The system of claim 1, wherein the execution device is further configured to execute the digital data relative to an audio information buffer maintained by the digital data processing device.

8. The system of claim 7, wherein the execution device is further configured to adjust a number of samples per frame of the digital data in relation to the rate of change in the audio information buffer maintained by the digital data processing device.

9. The system of claim 7, wherein the execution device is further configured to adjust a clock rate of the execution device in relation to the rate of change in the audio information buffer maintained by the digital data processing device.

10. The system of claim 1, wherein the digital data processing device is further configured to adjust the timestamp information relative to a rate of change in audio information buffer maintained by the execution device.

11. The system of claim 10, wherein the execution device is further configured to execute the digital data relative to the rate of change in the audio information buffer maintained by the execution device.

12. The system of claim 1, further comprising a plurality of execution devices wherein one of the execution devices is a master execution device configured to control the distribution of the offset information and source location information by the digital data processing device.

13. The system of claim 12, further comprising a user interface module configured to control the master execution device.

14. The system of claim 12, wherein the master execution device is configured to enable another execution device to join the plurality of execution devices.

15. The system of claim 1, wherein the offset information and source location information is distributed to the execution device using a selected multi-cast transmission methodology.

16. The system of claim 12, wherein the master execution device is configured to transfer the ability to control the digital data processing device such that another execution device becomes the new master execution device.

17. The system of claim 16, wherein the ability to control the digital data processing device includes the ability to transfer the digital data processing device function between various execution devices in the system.

18. A method for distributing digital data, the method comprising:
  receiving a stream processed by a digital data processing device to add header information to the stream and render digital data included in the stream unusable by an execution device, wherein rendering the digital data unusable by an execution device comprises at least one of blanking out and truncating the digital data, wherein the header information includes timestamp information, offset information, and source location information for the stream;
  locating a source of the digital data other than the digital data processing device based on the source location information;
  seeking an offset in the digital data based on the offset information; and
  retrieving the digital data at the offset from the source other than the digital data processing device.

19. The method of claim 18, further comprising executing the digital data relative to a clock rate maintained by the digital data processing device.

20. The method of claim 18, further comprising adjusting a number of samples per frame of the digital data in relation to the clock rate maintained by the digital data processing device.

21. The method of claim 18, further comprising adjusting a clock rate of an execution device in relation to the clock rate maintained by the digital data processing device.

22. The method of claim 18, further comprising adjusting the timestamp relative to a clock rate maintained by an execution device.

23. The method of claim 22, further comprising executing the digital data relative to the clock rate maintained by the execution device.

24. The method of claim 19, further comprising substituting a rate of change of an audio information buffer for the clock rate.

25. The method of claim 24, further comprising adjusting a number of samples per frame of the digital data in relation to the rate of change in the audio information buffer maintained by the digital data processing device.

26. The method of claim 24, further comprising adjusting a clock rate of an execution device in relation to the rate of change in the audio information buffer maintained by the digital data processing device.

27. The method of claim 18, further comprising adjusting the timestamp information relative to a rate of change in an audio information buffer maintained by an execution device.

28. The method of claim 27, further comprising executing the retrieved digital data relative to the rate of change in the audio information buffer maintained by the execution device.

29. The method of claim 18, further comprising notifying the digital data processing device via an out-of-band HTTP transaction that an execution device is prepared to initiate execution.

\* \* \* \* \*